United States Patent
Liu et al.

(10) Patent No.: US 12,130,926 B2
(45) Date of Patent: Oct. 29, 2024

(54) BIOS SAFE MODE UPDATE WITH SECURE AUTHENTICATION WHEN IMPLEMENTING MODIFIED BIOS OR ORIGINAL BIOS

(71) Applicant: Hewlett-Packard Development Company, L.P., Spring, TX (US)

(72) Inventors: Wei Ze Liu, Spring, TX (US); Rosilet Retnamoni Braduke, Spring, TX (US); ChengKai Yeh, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/041,400

(22) PCT Filed: Oct. 2, 2020

(86) PCT No.: PCT/US2020/054111
§ 371 (c)(1),
(2) Date: Feb. 10, 2023

(87) PCT Pub. No.: WO2022/071965
PCT Pub. Date: Apr. 7, 2022

(65) Prior Publication Data
US 2023/0297683 A1    Sep. 21, 2023

(51) Int. Cl.
*G06F 21/00* (2013.01)
*G06F 21/57* (2013.01)

(52) U.S. Cl.
CPC .................................. *G06F 21/575* (2013.01)

(58) Field of Classification Search
CPC ......... G06F 21/575; G06F 21/74; G06F 21/31
See application file for complete search history.

(56) References Cited

U.S. PATENT DOCUMENTS

| | | | |
|---|---|---|---|
| 6,308,265 B1 * | 10/2001 | Miller | G06F 11/1433 710/10 |
| 7,275,153 B2 * | 9/2007 | Kim | G06F 11/1433 714/E11.135 |
| 7,380,136 B2 | 5/2008 | Zimmer et al. | |
| 8,341,386 B2 * | 12/2012 | Lee | G06F 11/1433 713/1 |
| 8,356,167 B2 * | 1/2013 | Kumagai | G06F 11/1417 713/1 |
| 8,375,220 B2 | 2/2013 | Prakash et al. | |
| 8,392,762 B2 * | 3/2013 | Aralakuppe Ramegowda | G06F 11/1417 714/36 |
| 8,510,543 B1 | 8/2013 | Shankar et al. | |

(Continued)

FOREIGN PATENT DOCUMENTS

CN    2563637 Y    7/2003

*Primary Examiner* — Tammara R Peyton
(74) *Attorney, Agent, or Firm* — Knobbe, Martens, Olson & Bear, LLP (57) ABSTRACT

Examples of electronic devices are described herein. In some examples, an electronic device includes a memory and a controller. In some examples, the controller is to enable a basic input/output system (BIOS) safe mode in response to an authentication procedure. In some examples, the controller is to provide access to back-up variable service region in the memory storing default BIOS data. In some examples, the controller is to start a modified BIOS based on the default BIOS data in response to enablement of the BIOS safe mode.

13 Claims, 7 Drawing Sheets

(56) References Cited

U.S. PATENT DOCUMENTS

| | | | |
|---|---|---|---|
| 8,595,716 B2 * | 11/2013 | Keller | G06F 11/1433 717/176 |
| 9,779,241 B2 | 10/2017 | Jacobs et al. | |
| 10,210,046 B2 | 2/2019 | Wang et al. | |
| 2013/0311990 A1 | 11/2013 | Tang et al. | |
| 2016/0232057 A1 | 8/2016 | Star et al. | |
| 2016/0367138 A1 | 12/2016 | Kim et al. | |
| 2019/0102207 A1 | 4/2019 | Jeansonne et al. | |
| 2023/0195898 A1 * | 6/2023 | Braduke | G06F 11/1417 713/2 |

* cited by examiner

BIOS SAFE MODE UPDATE WITH SECURE AUTHENTICATION WHEN IMPLEMENTING MODIFIED BIOS OR ORIGINAL BIOS

BACKGROUND

Electronic technology has advanced to become virtually ubiquitous in society and has been used to improve many activities in society. For example, electronic devices are used to perform a variety of tasks, including work activities, communication, research, and entertainment. Different varieties of electronic circuits may be utilized to provide different varieties of electronic technology.

BRIEF DESCRIPTION OF THE DRAWINGS

Various examples will be described below by referring to the following figures.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

DETAILED DESCRIPTION

An electronic device may be a device that includes electronic circuitry. For instance, an electronic device may include integrated circuitry (e.g., transistors, digital logic, semiconductor technology, etc.). Examples of electronic devices include computing devices, laptop computers, desktop computers, smartphones, tablet devices, wireless communication devices, game consoles, game controllers, smart appliances, printing devices, vehicles with electronic components, aircraft, drones, robots, smart appliances, etc.

In some examples of the electronic devices described herein, an electronic device may include a Basic Input/Output System (BIOS). As used herein, a basic input/output system (BIOS) refers to hardware or hardware and instructions to initialize, control, or operate an electronic device prior to execution of an operating system (OS) of the electronic device. Instructions included within a BIOS may be software, firmware, microcode, or other programming that defines or controls functionality or operation of a BIOS. In one example, a BIOS may be implemented using instructions, such as platform firmware of an electronic device, executable by a processor. A BIOS may operate or execute prior to the execution of the OS of an electronic device. A BIOS may initialize, control, or operate components such as hardware components of an electronic device and may load or boot the OS of the electronic device.

In some examples, a BIOS may provide or establish an interface between hardware devices or platform firmware of the electronic device and an OS of the electronic device, via which the OS of the electronic device may control or operate hardware devices or platform firmware of the electronic device. In some examples, a BIOS may implement the Unified Extensible Firmware Interface (UEFI) specification or another specification or standard for initializing, controlling, or operating an electronic device.

With more and more hardware and pre-boot features being included in electronic devices, the BIOS of an electronic device may become much more complicated. As the BIOS becomes more complicated, the chances that the BIOS and/or OS operate incorrectly may increase. For example, pre-boot operations of the electronic device may not work as expected due to a conflict in the BIOS. This scenario may result in the electronic device failing to boot or the electronic device may boot incorrectly.

Without a successful boot of the electronic device, it may be challenging to diagnosis and/or recover the electronic device. In some examples, it may be especially difficult to diagnose and/or repair software in the event that the electronic device fails to boot. In some examples, the electronic device may fail to boot due to faulty hardware or corrupted (e.g., invalid) BIOS data.

A BIOS safe mode is described herein. As used herein, the BIOS safe mode is a state of the electronic device in which a modified BIOS loads an operating system (OS) of the electronic device 102 in a restricted environment. As used herein, a restricted environment includes executing an OS or other process (e.g., UEFI shell) with limited available resources (e.g., hardware devices, file descriptors, memory, file system space, network resources, etc.). In some examples, a BIOS safe mode may be triggered. In response to the BIOS safe mode trigger, a BIOS may use default (e.g., factory installed) BIOS data. The BIOS may skip hardware initialization and hardware related features as much as possible to boot to the OS or an embedded UEFI shell. A user may then run a diagnostic and/or repair tool to identify the issues or recover the electronic device.

Figure 1:
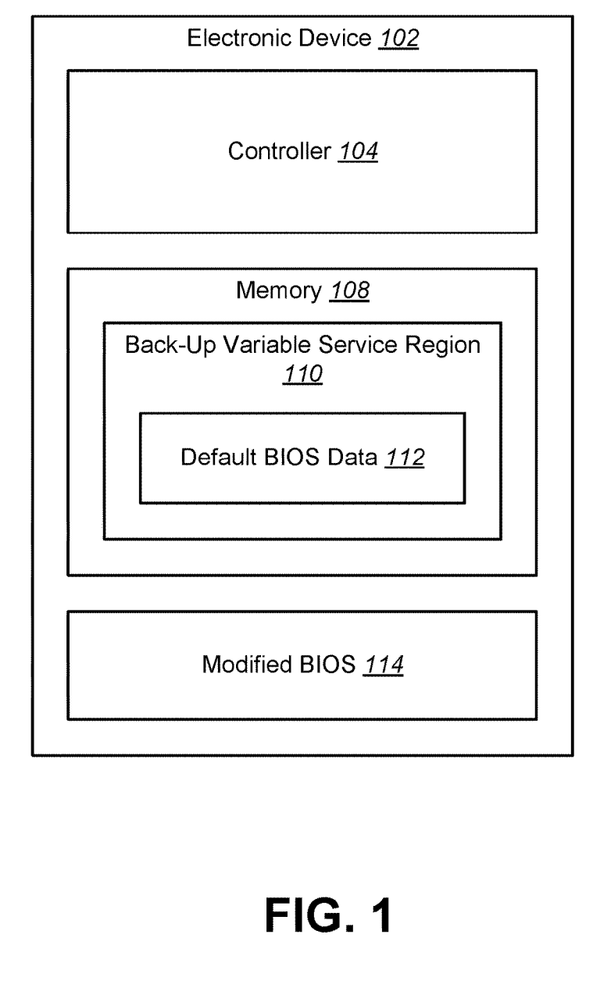
FIG. 1 is a block diagram illustrating an example of an electronic device that may be utilized for a basic input/output system (BIOS) safe mode.

FIG. 1 is a block diagram illustrating an example of an electronic device 102 that may be utilized for a basic input/output system (BIOS) safe mode. Examples of the electronic device 102 may include computing devices, laptop computers, desktop computers, tablet devices, cellular phones, smartphones, wireless communication devices, game consoles, gaming controllers, smart appliances, printing devices, vehicles with electronic components, aircraft, drones, robots, smart appliances, etc.

In some examples, the electronic device 102 may include a controller 104. The controller 104 may be any of a microcontroller (e.g., embedded controller), a central processing unit (CPU), a semiconductor-based microprocessor, graphics processing unit (GPU), field-programmable gate array (FPGA), an application-specific integrated circuit (ASIC), a circuit, a chipset, and/or other hardware device suitable for retrieval and execution of instructions stored in a memory 108. The controller 104 may fetch, decode, and/or execute instructions stored in the memory 108. While a single controller 104 is shown in FIG. 1, in other examples, the controller 104 may include multiple processors (e.g., a CPU and a GPU).

The memory 108 may be any electronic, magnetic, optical, and/or other physical storage device that contains or stores electronic information (e.g., instructions and/or data). The memory 108 may be, for example, Random Access Memory (RAM), Electrically Erasable Programmable Read-Only Memory (EEPROM), Dynamic Random Access Memory (DRAM), Synchronous DRAM (SDRAM), magnetoresistive random-access memory (MRAM), phase change RAM (PCRAM), non-volatile random-access memory (NVRAM), memristor, flash memory, a storage device, and/or an optical disc, etc. In some examples, the memory 108 may be a non-transitory tangible computer-readable storage medium, where the term "non-transitory" does not encompass transitory propagating signals. The controller 104 may be in electronic communication with the memory 108. In some examples, a controller 104 and/or memory 108 of the electronic device 102 may be combined with or separate from a processor (e.g., CPU) and/or memory of a host device.

In some examples, the electronic device 102 may include different sets of memory. For example, the controller 104 may store certain information (e.g., instructions executed by the controller 104, default BIOS data 112, etc.) in a first memory. The BIOS (e.g., modified BIOS 114) of the electronic device 102 may store other information (e.g., instructions executed by the BIOS) in a second memory.

In some examples, the controller 104 may enable a BIOS safe mode in response to an authentication procedure. The BIOS safe mode may be a state of the electronic device 102 in which a modified BIOS 114 loads an operating system (OS) of the electronic device 102 in a restricted environment. The BIOS safe mode may be triggered by an authentication procedure that provides security against unauthorized access to the restricted environment of the OS.

In a first example, the BIOS safe mode may be triggered by a hot key sequence. For example, during power up of the electronic device 102, a single key or a sequence of keys of the electronic device 102 may be pressed. The controller 104 may detect a particular hot key sequence. Therefore, the controller 104 may detect the hot key trigger for the BIOS safe mode and may take a safe boot mode path.

In response to the hot key sequence, the controller 104 may launch a modified BIOS 114 to perform an authentication procedure. In some examples, the authentication procedure may include receiving and authenticating a password. For example, the modified BIOS 114 started by the controller 104 may prompt a user for an administrative password to continue booting the electronic device 102. If the administrative password does not exist or cannot be authenticated, the modified BIOS 114 may shut down the electronic device 102.

In another example, the controller 104 may enable the BIOS safe mode in response to receiving a command from a wireless communication device via a data-over-voice call. For example, the electronic device 102 may be provisioned and paired with the wireless communication device (e.g., a cell phone, smartphone, etc.) via a data-over-voice call. A user may send a secured command via the data-over-voice call to the controller 104. In response to receiving the command from the wireless communication device, the controller 104 may enable the BIOS safe mode and may power up the electronic device 102.

In some examples, the controller 104 may provide access to a back-up variable service region 110 in the memory 108 storing default BIOS data 112. The controller 104 may provide access to the back-up variable service region 110 to a modified BIOS 114. For example, the controller 104 may instruct a BIOS variable service to direct access from an active variable service region to the back-up variable service region 110.

The back-up variable service region 110 (also referred to as a UEFI variable service region) may hold default (e.g., factory installed) BIOS data 112. In some examples, the back-up variable service region 110 may be a portion of the memory 108 that stores the default BIOS data 112. The back-up variable service region 110 may be protected from access unless the BIOS safe mode is triggered through the authentication procedure. When BIOS safe mode is enabled, the BIOS variable service may re-direct access of UEFI variables from an active variable service region to the back-up variable service region 110.

The default BIOS data 112 may be information (e.g., UEFI variables) that the modified BIOS 114 uses to boot the OS of the electronic device 102. In some examples, the default BIOS data 112 may help the modified BIOS 114 boot the electronic device 102. For example, BIOS data may become corrupted over time. The corrupted BIOS data may result in the electronic device 102 failing to boot. The default BIOS data 112 may be BIOS data that is used to ensure a successful boot of the electronic device 102.

In some examples, the default BIOS data 112 may include a Trusted Platform Module (TPM) state. The TPM may be a microchip that is included in the electronic device 102 to provide hardware-based security. A defect in the TPM may result in a slow or no response from the electronic device 102, which may block boot of the electronic device 102. In some examples, the default BIOS data 112 may suspend the TPM as default, which may cause the electronic device 102 to skip some security checks that may be blocking boot of the electronic device 102.

Another example of the default BIOS data 112 may include trusted execution technology (TXT) settings. TXT is a hardware-based approach to provide a trusted way for loading and executing software (e.g., an operating system) on the electronic device 102. A defect in memory (e.g., a defective dual in-line memory module (DIMM) or an incorrect security setting may lead TXT to be in an incorrect state, resulting in boot failure. Therefore, the default BIOS data 112 may suspend the TXT as default, which may disable the TXT process to allow the electronic device 102 to boot. Once the issue that is preventing the electronic device 102 from booting is identified and resolved, the TXT may be enabled.

In other examples, the default BIOS data 112 may include disabling devices included in the electronic device 102. This may include devices that communicate over a bus of the electronic device 102. For example, the electronic device 102 may include devices that communicate on a peripheral component interconnect express (PCIE) bus and/or a Universal Serial Bus (USB). A defect in a device or the bus (e.g., PCIE, USB, etc.) may slow a BIOS query to the device or may result in no response to the BIOS query. Therefore, the default BIOS data 112 may include disabling devices included in the electronic device 102 as default. This may cause the BIOS to skip the initialization and/or enumeration of these devices. In some examples, devices may be identified under Port Options. Once identified, the devices may be disabled. In other examples, the devices may be disabled using a Preboot eXecution Environment (PXE) driver and/or instructions included in a read-only memory (ROM).

The controller 104 may start the modified BIOS 114 based on the default BIOS data 112 in response to enablement of the BIOS safe mode. For example, the controller 104 may switch from a first BIOS to the modified BIOS 114 in response to enablement of the BIOS safe mode. The first BIOS may be the main BIOS that is used to boot the electronic device 102. However, once the BIOS safe mode is triggered (e.g., via an authentication procedure), the controller 104 may start the modified BIOS 114 instead of the first BIOS.

In a first example, the controller 104 may implement the modified BIOS 114 by switching which modules of a BIOS are activated or deactivated in response to enablement of the BIOS safe mode. Examples of this dual-path approach are described in FIG. 2.

In another example, the electronic device 102 may include a first BIOS and a second BIOS (e.g., the modified BIOS 114). The electronic device 102 may start the first BIOS for normal BIOS operation and may start the modified BIOS 114 in response to enablement of the BIOS safe mode. Examples of this approach are described in FIG. 3.

The modified BIOS 114 may provide restricted functionality on the electronic device 102 without blocking boot of the electronic device 102. For example, the modified BIOS 114 may load a restricted OS environment or a UEFI shell using the default BIOS data 112. The modified BIOS 114 may also boot a reduced (e.g., minimum) amount of hardware.

Once the restricted OS environment or UEFI shell is loaded, diagnostics may be performed on the electronic device 102. For example, a user may run a tool (e.g., a program and/or hardware) to identify reasons why the electronic device 102 is not booting using the main BIOS. In some examples, the BIOS data may be set to the default BIOS data 112 and/or faulty hardware may be replaced.

Figure 2:
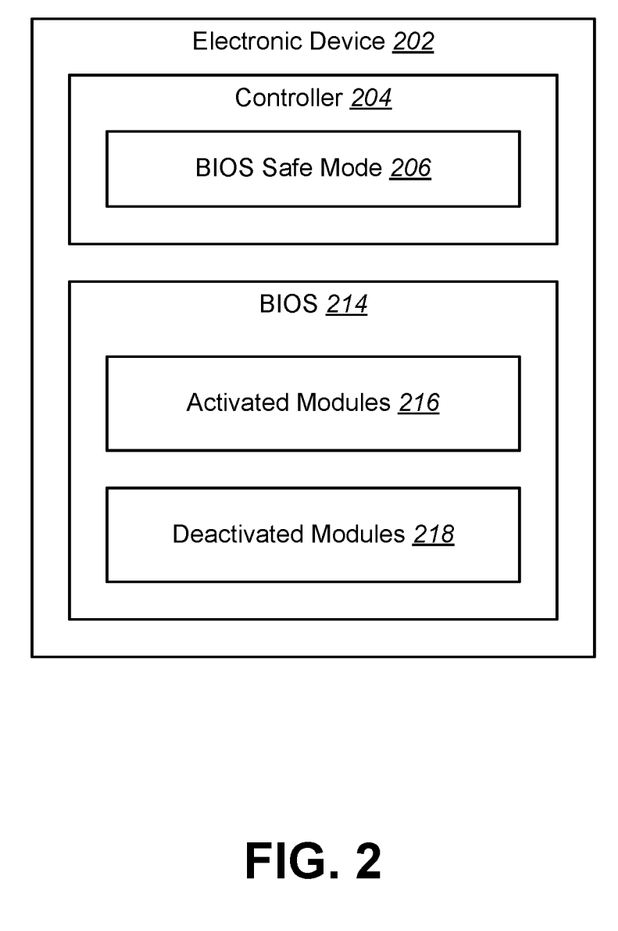
FIG. 2 is a block diagram illustrating another example of an electronic device that may be utilized for BIOS safe mode.

FIG. 2 is a block diagram illustrating another example of an electronic device 202 that may be utilized for BIOS safe mode. The electronic device 202 may be implemented in accordance with the electronic device 102 described in FIG. 1. For example, the electronic device 202 may include a controller 204 as described in FIG. 1.

In some examples, the controller 204 may enable a BIOS safe mode in response to a safe mode trigger. For example, the safe mode trigger may include an authentication procedure as described in FIG. 1.

In some examples, the controller 204 may provide access to a back-up variable service region storing default BIOS data. This may be accomplished as described in FIG. 1. For example, the controller may instruct the BIOS 214 to use the default BIOS data when booting the electronic device 202.

In some examples, the controller 204 may implement a dual path for activating modules of the BIOS 214 based on the BIOS safe mode. For example, the controller 204 may modify the BIOS 214 of the electronic device in response to enablement of the BIOS safe mode. The controller 204 may modify the BIOS 214 by selecting which portions of the BIOS 214 are activated and which portions of the BIOS 214 are deactivated based on whether BIOS safe mode is enabled. In this approach, the BIOS 214 may be based on a driver model. The BIOS 214 may be the main BIOS that executes during normal BIOS operation of the electronic device 102. However, the BIOS 214 may be modified to run a subset of modules in response to activation of BIOS safe mode.

The BIOS 214 may be divided into modules (also referred to as drivers). As used herein, a module is a particular portion of programming instructions that may be executed. For example, a first module may be executed, followed by a second module, and so forth. Each module of the BIOS 214 may be designated as either an "activated module" or a "deactivated module." The activated modules 216 may include the modules of the BIOS 214 that are supported (e.g., launched) in BIOS safe mode. The deactivated modules 218 may include modules of the BIOS 214 that are unsupported (e.g., blocked from running) in the BIOS safe mode.

The activated modules 216 of the modified BIOS 214 may provide restricted functionality on the electronic device 202 without blocking boot of the electronic device 202. For example, by running the subset of activated modules 216, the BIOS 214 may provide limited functionality on the electronic device 102. In some examples, the BIOS 214 may start a restricted OS environment using the activated modules 216. Furthermore, in some examples the BIOS 214 may start a reduced amount of hardware on the electronic device 102 using the activated modules 216.

It should be noted that in normal BIOS operation mode (e.g., when BIOS safe mode is not enabled), the BIOS 214 may launch all of the modules. Therefore, in normal BIOS operation mode both the activated modules 216 and the deactivated modules 218 may be set to launch.

Because the modules of the BIOS 214 are designated as either activated modules 216 or deactivated modules 218, the BIOS 214 may include two paths. The first path may include the modules activated in a normal (e.g., standard) BIOS operation mode. This first path may include all of the modules of the BIOS 214. The second path may include the activated modules 216 and the deactivated modules 218 in the BIOS safe mode.

In some examples, a platform configuration database (PCD) may determine the activated modules 216 and the deactivated modules 218 for the BIOS 214. For example, a first set of modules of the BIOS 214 may be designated as the activated modules 216 in the PCD. A second set of modules may be designated as the deactivated modules 218 within the PCD.

The controller 204 may start the modified BIOS 214. For example, if the BIOS safe mode is enabled, then the controller 204 may read the PCD to determine which modules of the BIOS 214 to launch. The controller 204 may start the activated modules 216 and may block the launch of the deactivated modules 218.

Figure 3:
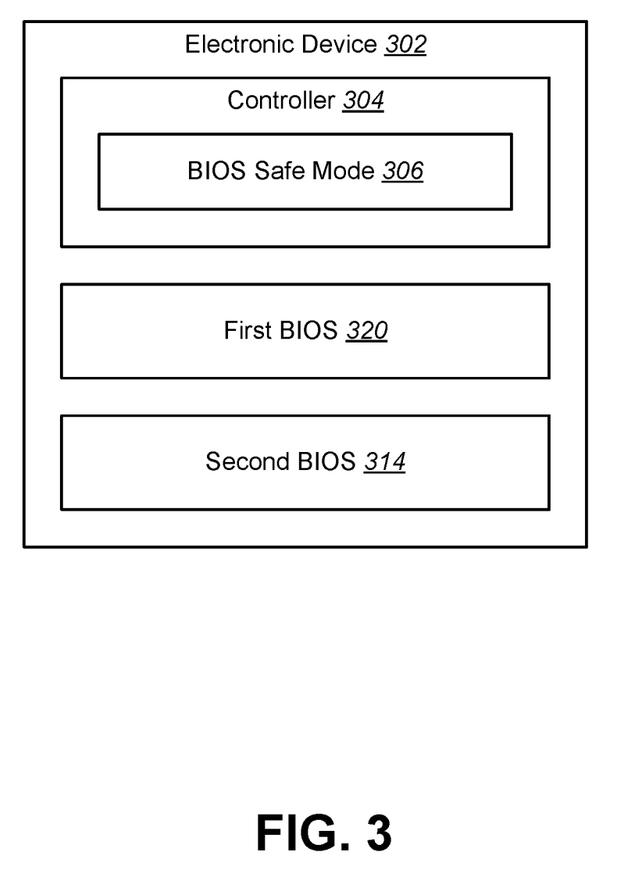
FIG. 3 is a block diagram illustrating yet another example of an electronic device that may be utilized for BIOS safe mode.

FIG. 3 is a block diagram illustrating yet another example of an electronic device 302 that may be utilized for BIOS safe mode. The electronic device 302 may be implemented in accordance with the electronic device 102 described in FIG. 1. For example, the electronic device 302 may include a controller 304 as described in FIG. 1.

In some examples, the controller 304 may enable a BIOS safe mode in response to a safe mode trigger. For example, the safe mode trigger may include an authentication procedure as described in FIG. 1.

In some examples, the controller 304 may provide access to a back-up variable service region storing default BIOS data. This may be accomplished as described in FIG. 1. For example, the controller may instruct the second BIOS 314 to use the default BIOS data when booting the electronic device 302.

The controller 304 may start a second BIOS 314 instead of a first BIOS 320 in response to enablement of the BIOS safe mode. For example, the first BIOS 320 may be used for normal BIOS operation (e.g., when BIOS safe mode is not enabled). The second BIOS 314 may be a modified BIOS that provides restricted functionality to the electronic device 302 as compared to the first BIOS 320. For example, the second BIOS 314 may boot an OS of the electronic device 302 in a restricted operating system environment or UEFI shell. In some examples, the second BIOS 314 may be a modified version of the first BIOS 320 that includes fewer modules of the first BIOS 320.

In some examples, the second BIOS 314 may be stored in a private memory of the controller 304. For example, the second BIOS 314 may be stored in the private memory of the controller 304 when the electronic device 302 is manufactured. In some examples, the private memory may be memory that is exclusively accessible by the controller 304.

In some examples, the controller 304 may run from the first BIOS 320 up to memory initialization of the electronic device 302 in response to enablement of the BIOS safe mode. For example, the controller 304 may use the first BIOS 320 to perform a first stage of a UEFI boot. This may include a security phase of the boot process. The first BIOS 320 may initialize a temporary memory (e.g., CPU cache) once the BIOS safe mode is triggered.

The controller 304 may load and execute a plurality of pre-executable firmware interface initialization (PEI) modules from the second BIOS 314 to perform memory initialization. In some examples, the controller 304 may use a secured interface to load the PEI modules from the second BIOS 314. In some examples, the PEI modules may handle early hardware initialization tasks such as main memory initialization and/or recovery operations.

In some examples, the secured interface may include Shared Memory (SHM) in a Memory-mapped I/O (MMIO)-based communication path. In this case, data may be securely transferred between the controller 304 (e.g., embedded controller) and a host of the electronic device 302 using the SHM and MMIO-based communication path. For example, a transferred data block may be encrypted to provide data privacy.

In another example of a secured interface, data transfer may be associated with hash-based message authentication code (HMAC) information. Thus, tampering of data may be avoided. For example, the controller 304 and the host of the electronic device 302 may include keys to perform encryption/decryption or HMAC operations on the transferred data.

Upon loading the PEI modules from the second BIOS 314, boot block execution may be complete. At this point, the controller 304 may load a Driver eXecution Environment (DXE) and boot device selection (BDS) from the second BIOS 314. For example, the DXE may be used to initialize components (e.g., chipsets, processors, etc.) of the electronic device 302. The BDS may be used to boot an operating system of the electronic device 302. In some examples, the DXE of the second BIOS 314 may load a restricted subset of hardware components and the BDS may load a restricted OS environment or UEFI shell. In some examples, the DXE and BSD of the second BIOS 314 may be loaded and executed using the secured interface of the controller 304.

Once the restricted OS environment or UEFI shell is loaded, a user may perform diagnostics and recovery on the electronic device 302. This may be accomplished as described in FIG. 1.

Figure 4:
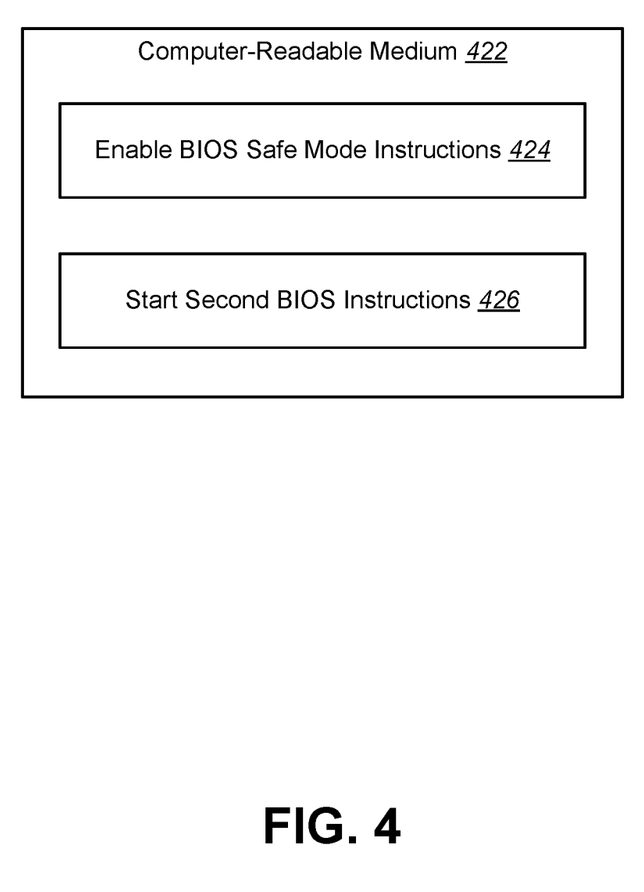
FIG. 4 is a block diagram illustrating an example of a computer-readable medium for BIOS safe mode.

FIG. 4 is a block diagram illustrating an example of a computer-readable medium 422 for BIOS safe mode. The computer-readable medium 422 may be a non-transitory, tangible computer-readable medium 422. The computer-readable medium 422 may be, for example, RAM, EEPROM, a storage device, an optical disc, and the like. In some examples, the computer-readable medium 422 may be volatile and/or non-volatile memory, such as DRAM, EEPROM, MRAM, PCRAM, memristor, flash memory, and the like. In some examples, the computer-readable medium 422 described in FIG. 4 may be an example of memory for an electronic device 102 described in FIG. 1, memory for an electronic device 202 described in FIG. 2, or memory for an electronic device 302 described in FIG. 3. In some examples, code (e.g., data and/or executable code or instructions) of the computer-readable medium 422 may be transferred and/or loaded to memory or memories of the electronic device 102, electronic device 202, or electronic device 302.

The computer-readable medium 422 may include code (e.g., data and/or executable code or instructions). For example, the computer-readable medium 422 may include enable BIOS safe mode instructions 424 and start second BIOS instructions 426.

In some examples, the enable BIOS safe mode instructions 424 may be instructions that when executed cause a controller of the electronic device to enable a BIOS safe mode in response to a safe mode trigger. For example, the controller may detect a hot key sequence or may receive a command (e.g., from a wireless communication device) to initialize the BIOS safe mode. The controller may then perform an authentication procedure before entering the BIOS safe mode. In some examples, this may be accomplished as described in FIGS. 1-3.

In some examples, the start second BIOS instructions 426 may be instructions that when executed cause the controller of the electronic device to start a second BIOS instead of a first BIOS in response to enablement of the BIOS safe mode. In some examples, the second BIOS may be stored in a private memory of the controller. In some examples, the second BIOS may provide restricted functionality to the electronic device. For example, the second BIOS may boot an operating system of the electronic device in a restricted operating system environment. In some examples, this may be accomplished as described in FIGS. 1-3.

In some examples, the start second BIOS instructions 426 may cause the controller to run from the first BIOS up to memory initialization of the electronic device in response to enablement of the BIOS safe mode. The controller may then load a plurality of PEI modules from the second BIOS using a secured interface of the controller. Upon loading and executing the PEI modules, the controller may load a DXE and BDS from the second BIOS using the secured interface of the controller. In some examples, this may be accomplished as described in FIG. 3.

Figure 5:
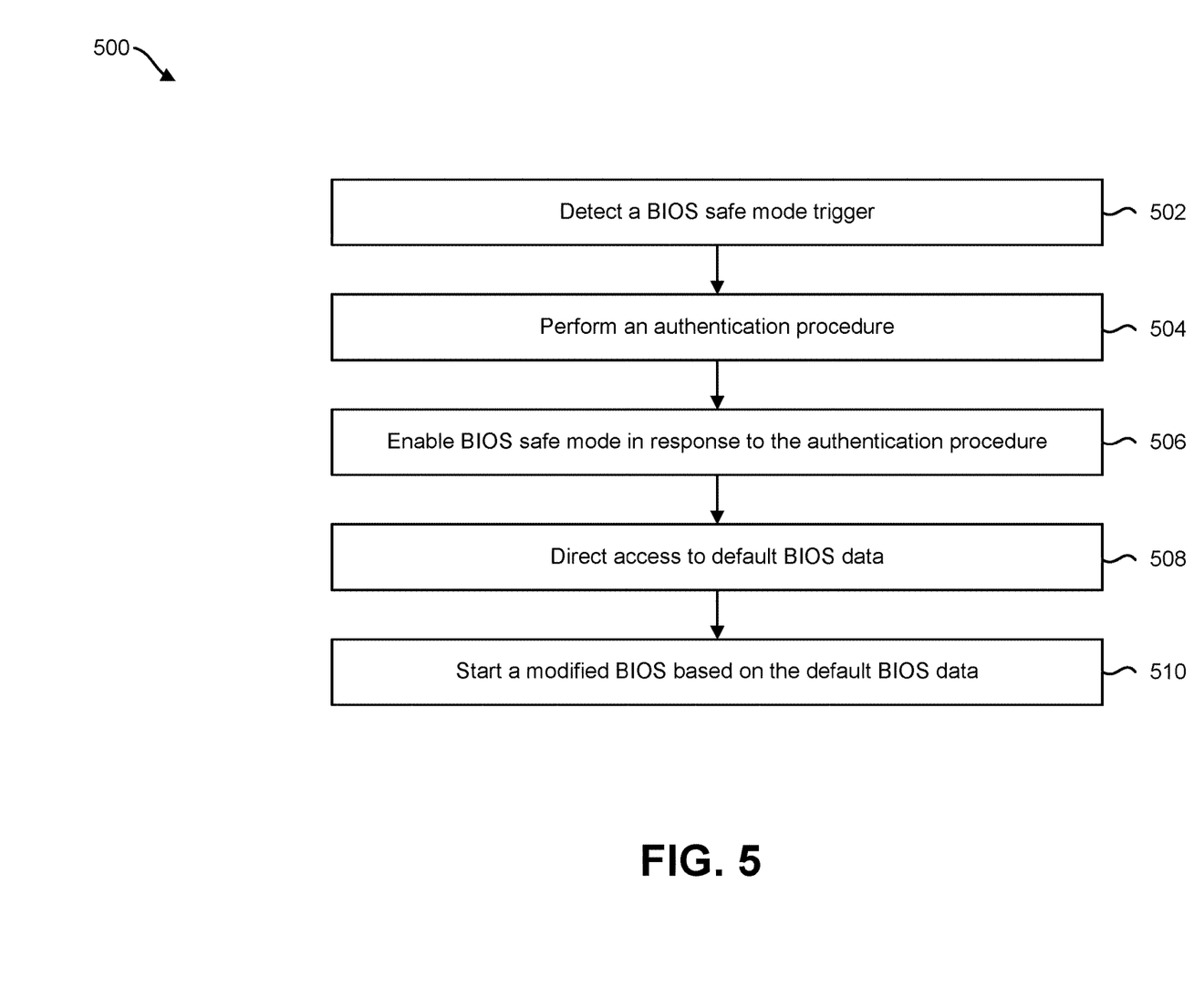
FIG. 5 is a flow diagram illustrating an example for implementing a BIOS safe mode.

FIG. 5 is a flow diagram illustrating an example of a method 500 for implementing a BIOS safe mode. The method 500 and/or an element or elements of the method 500 may be performed by an electronic device. For example, an element or elements of the method 500 may be performed by the electronic device 102 or the controller 104 described in FIG. 1; the electronic device 202 or controller 204 described in FIG. 2; and/or the electronic device 302 or controller 304 described in FIG. 3, any of which may be referred to generally as an "electronic device" in FIG. 5.

At 502, the electronic device may detect a BIOS safe mode trigger. For example, the electronic device (e.g., controller) may detect a hot key sequence that triggers the BIOS safe mode. In another example, the electronic device may receive a command (e.g., from a wireless communication device) to initialize the BIOS safe mode.

At 504, the electronic device may perform an authentication procedure. In some examples, the authentication procedure may include receiving and authenticating a password. For example, the electronic device may prompt a user for an administrative password to continue booting the electronic device. In other examples, the authentication procedure may be part of receiving the command from the wireless communication device to initialize the BIOS safe mode.

At 506, the electronic device may enable BIOS safe mode in response to the authentication procedure. The BIOS safe mode may be a state of the electronic device in which a modified BIOS loads an operating system (OS) of the electronic device in a restricted environment. The electronic device may enable the BIOS safe mode by switching from a first BIOS (e.g., the main BIOS) to a modified BIOS for booting the OS.

At 508, the electronic device may direct access to default BIOS data. For example, the electronic device (e.g., the controller) may provide access to a back-up variable service region in memory storing the default BIOS data. The electronic device (e.g., controller) may provide access to the back-up variable service region to a modified BIOS. For example, the electronic device (e.g., controller) may instruct a BIOS variable service to direct access from an active variable service region to the back-up variable service region in response to BIOS safe mode activation.

At 510, the electronic device may start a modified BIOS based on the default BIOS data. In a first example, the electronic device may modify a main BIOS by switching which modules of a BIOS are activated or deactivated. Examples of this dual-path approach are described in FIG. 2. In another example, the electronic device may switch from a first BIOS (e.g., the main BIOS) to a second BIOS (e.g., the modified BIOS) in response to enablement of the BIOS safe mode. Examples of this approach are described in FIG. 3. The modified BIOS may be executed using the default BIOS data.

Figure 6:
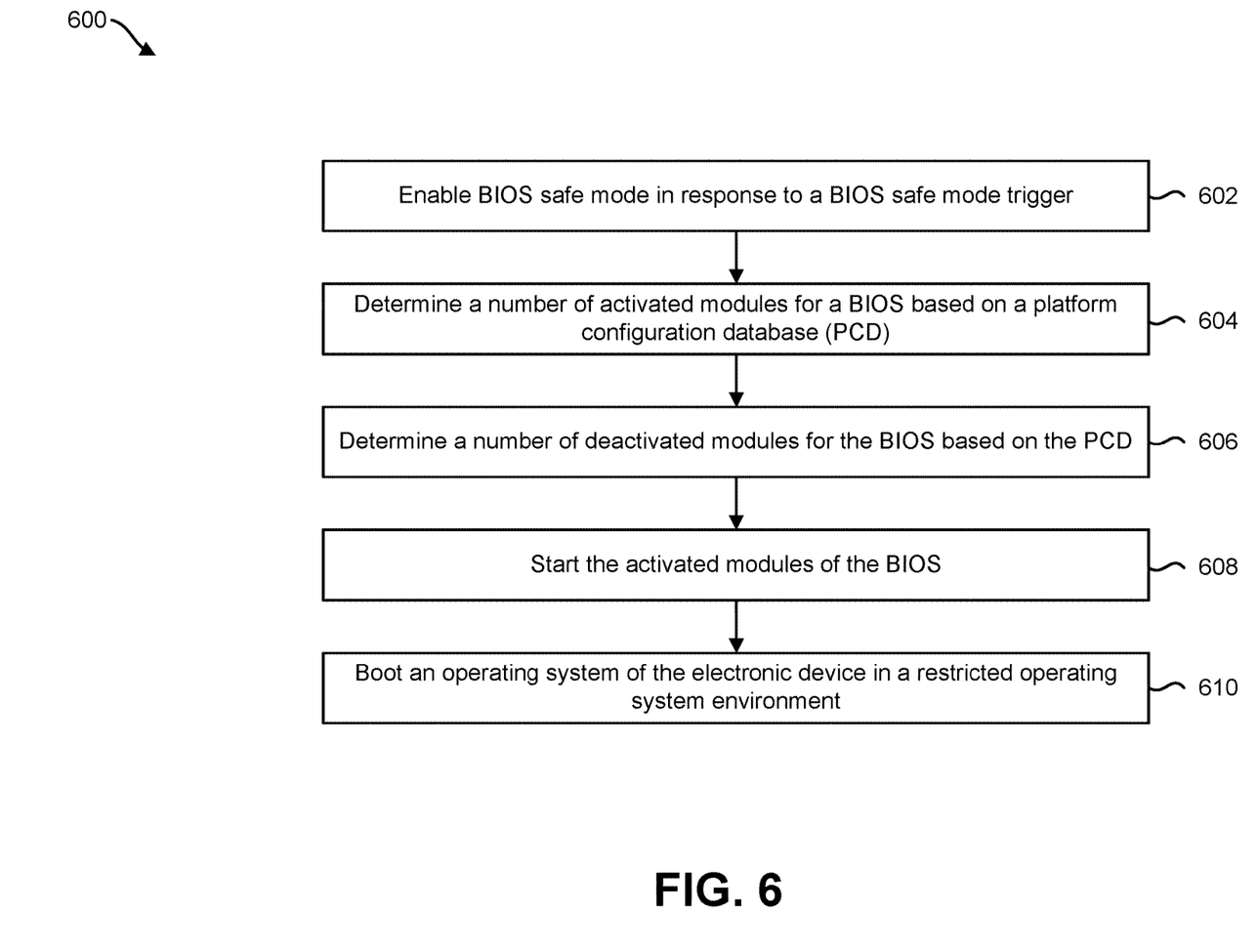
FIG. 6 is a flow diagram illustrating another example for implementing a BIOS safe mode.

FIG. 6 is a flow diagram illustrating another example of a method 600 for implementing a BIOS safe mode. The method 600 and/or an element or elements of the method 600 may be performed by an electronic device. For example, an element or elements of the method 600 may be performed by the electronic device 102 or the controller 104 described in FIG. 1; the electronic device 202 or controller 204 described in FIG. 2; and/or the electronic device 302 or controller 304 described in FIG. 3, any of which may be referred to generally as an "electronic device" in FIG. 6.

At 602, the electronic device may enable BIOS safe mode in response to a BIOS safe mode trigger. This may be accomplished as described in FIG. 5.

At 604, the electronic device may determine a number of activated modules for a BIOS based on a platform configuration database (PCD). In some examples, the main BIOS of the electronic device may include a number of modules. The PCD may designate each module of the BIOS as either an activated module or a deactivated module. The activated modules are to be started when the BIOS safe mode is enabled. The deactivated modules are to be blocked (e.g., deactivated) when the BIOS safe mode is enabled.

At 606, the electronic device may determine a number of deactivated modules for the BIOS based on the PCD. As described above, the PCD may designate a number of BIOS modules as deactivated modules.

At 608, the electronic device may start the activated modules of the BIOS. For example, the electronic device may load and execute the BIOS modules that are designated as activated modules in the PCD.

At 610, the electronic device may boot an operating system of the electronic device in a restricted operating system environment. For example, the activated modules of the modified BIOS may provide restricted functionality on the electronic device without blocking boot of the electronic device. The activated modules of the modified BIOS may restrict the resources (e.g., hardware and/or software resources) available to the OS. For example, by starting a subset of the BIOS modules (e.g., the activated modules), the resources that would have been started by the deactivated modules are not available once the modified BIOS boots the OS.

Figure 7:
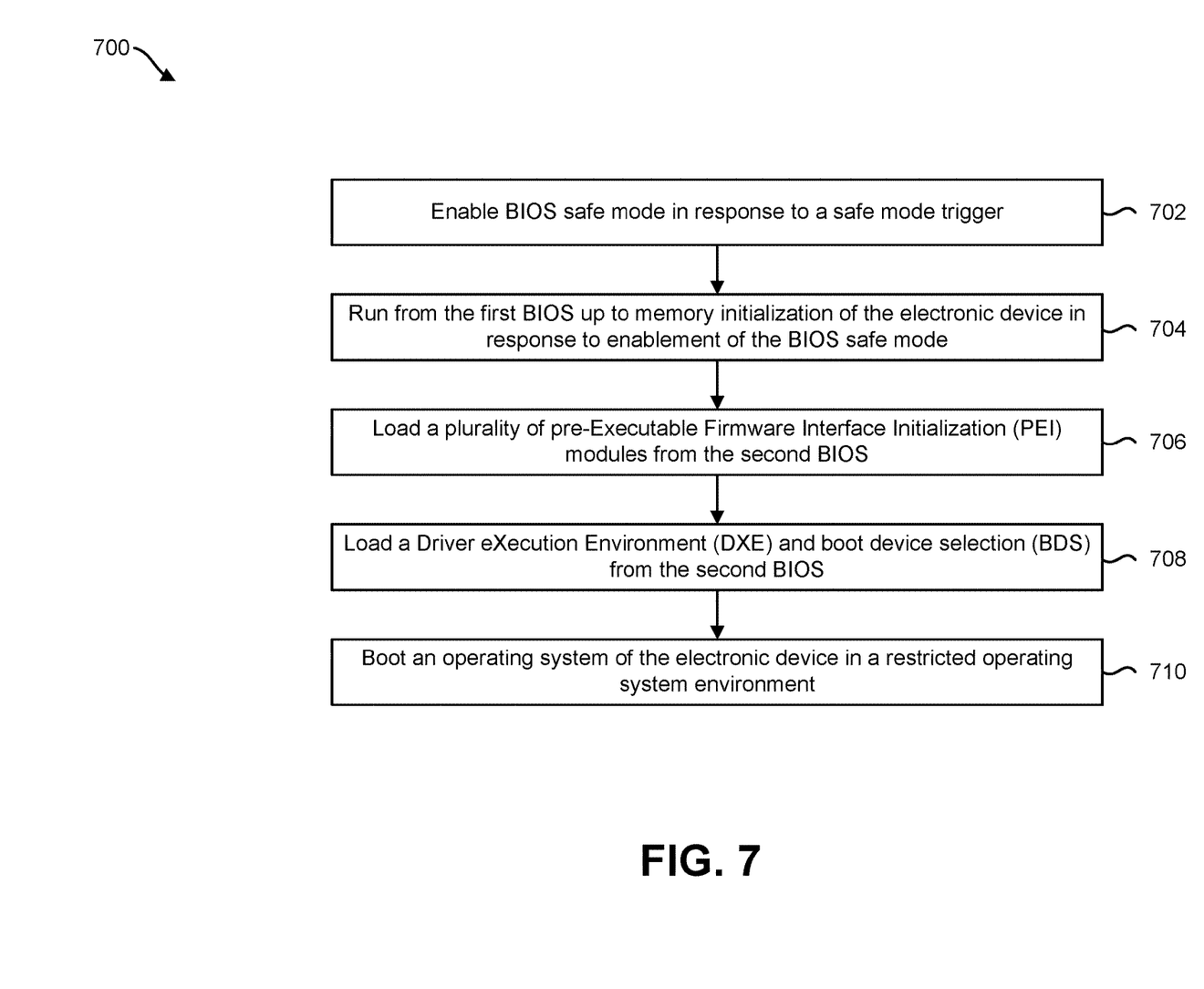
FIG. 7 is a flow diagram illustrating yet another example for implementing a BIOS safe mode.

FIG. 7 is a flow diagram illustrating another example of a method 700 for implementing a BIOS safe mode. The method 700 and/or an element or elements of the method 700 may be performed by an electronic device. For example, an element or elements of the method 700 may be performed by the electronic device 102 or the controller 104 described in FIG. 1; the electronic device 202 or controller 204 described in FIG. 2; and/or the electronic device 302 or controller 304 described in FIG. 3, any of which may be referred to generally as an "electronic device" in FIG. 7.

At 702, the electronic device may enable BIOS safe mode in response to a BIOS safe mode trigger. This may be accomplished as described in FIG. 5.

At 704, the electronic device may run from a first BIOS up to memory initialization of the electronic device in response to enablement of the BIOS safe mode. For example, electronic device may include a first BIOS (e.g., the main BIOS) and a second BIOS (e.g., a modified BIOS). The electronic device (e.g., controller) may use the first BIOS to initialize memory on the electronic device once the BIOS safe mode is triggered.

At 706, the electronic device may load a plurality of pre-Executable Firmware Interface Initialization (PEI) modules from the second BIOS using a secured interface. The PEI modules may handle early hardware initialization tasks that include memory initialization.

At 708, the electronic device may load a Driver eXecution Environment (DXE) and boot device selection (BDS) from the second BIOS. The DXE may be used to initialize components (e.g., chipsets, processors, etc.) of the electronic device. The BDS may be used to boot an operating system of the electronic device. In some examples, the DXE of the second BIOS may load a restricted (e.g., limited) subset of hardware components and the BDS may load a restricted OS environment or UEFI shell.

At 710, the electronic device may boot an operating system of the electronic device in a restricted operating system environment. For example, the BDS may boot the OS of the electronic device in restricted environment. In some examples, the resources available in the restricted OS environment may be determined by the default BIOS data that is used by the second BIOS when the electronic device enters BIOS safe mode.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. An electronic device comprising:
a memory including a back-up variable service region;
a first basic input/output system (BIOS); and
a controller in communication with the first BIOS and the memory, wherein the controller is to:

enable a BIOS safe mode in response to an authentication procedure; and during the BIOS safe mode:

initiate a modified BIOS instead of the first BIOS;

provide, to the modified BIOS, access to the back-up variable service region in the memory, wherein the back-up variable service region stores default BIOS data; and load an operating system with the modified BIOS based on the default BIOS data.

2. The electronic device of claim 1, wherein the authentication procedure includes receiving and authenticating a password.

3. The electronic device of claim 1, wherein the authentication procedure includes receiving, with the controller, a secured command from a wireless communication device via a data-over-voice call.

4. An electronic device comprising:

a basic input/output system (BIOS); and a controller in communication with the BIOS, wherein the controller is to:

enable a BIOS safe mode in response to a safe mode trigger; and in response to enabling the BIOS safe mode:

modify the BIOS of the electronic device, wherein to modify the BIOS the controller is to:

designate a module of the BIOS as an activated module that is launched in the BIOS safe mode, and designate a module of the BIOS as a deactivated module that is blocked from launch in the BIOS safe mode; and start the modified BIOS.

5. The electronic device of claim 4, wherein the BIOS for the electronic device comprises:

a first path for including a module of the BIOS activated in a normal BIOS operation mode and a second path including the activated module and the deactivated module designated in the BIOS safe mode.

6. The electronic device of claim 4, wherein the activated module provides restricted functionality on the electronic device without blocking boot of the electronic device.

7. The electronic device of claim 4, wherein a platform configuration database determines the activated module and the deactivated designated in the BIOS safe mode.

8. The electronic device of claim 7, wherein a first set of modules of the BIOS are designated as the activated module and a second set of modules are designated as the deactivated modules-module within the platform configuration database.

9. A non-transitory tangible computer-readable medium storing instructions that, when executed by a controller of an electronic device, cause the controller of the electronic device to:

enable a basic input/output system (BIOS) safe mode instead of a standard BIOS operation mode in response to a safe mode trigger, wherein a standard BIOS is divided into BIOS modules; and start a modified BIOS instead of the standard BIOS in response to enabling the BIOS safe mode, wherein during the BIOS safe mode, the modified BIOS launches a subset of the BIOS modules.

10. The non-transitory tangible computer-readable medium of claim 9, wherein the modified BIOS is stored in a private memory of the controller.

11. The non-transitory tangible computer-readable medium of claim 9, wherein the modified BIOS is to boot an operating system of the electronic device in a restricted operating system environment.

12. The non-transitory tangible computer-readable medium of claim 9, storing further instructions that, when executed by the controller, cause the controller to:

run from the standard BIOS until memory initialization of the electronic device in response to enablement of the BIOS safe mode; and load, with a secured interface of the controller, a plurality of pre-Executable Firmware Interface Initialization (PEI) modules from the modified BIOS, wherein the plurality of PEI modules perform the memory initialization.

13. The non-transitory tangible computer-readable medium of claim 12, storing further instructions that, when executed by the controller, cause the controller to:

load, with a secured interface of the controller, a Driver execution Environment (DXE) and boot device selection (BDS) from the modified BIOS.

* * * * *